(12) United States Patent
Grady et al.

(10) Patent No.: US 7,578,546 B2
(45) Date of Patent: Aug. 25, 2009

(54) REMOVABLE CHASSIS SKIRT

(75) Inventors: Kevin L. Grady, Fort Wayne, IN (US); Matthew D. Friede, Fort Wayne, IN (US); Michael C. DePoy, Fort Wayne, IN (US); Brad D. Singer, Woodburn, IN (US); Harry A. Manges, Fort Wayne, IN (US); Arden L. King, Churubusco, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/688,299

(22) Filed: Mar. 20, 2007

(65) Prior Publication Data

US 2008/0231079 A1 Sep. 25, 2008

(51) Int. Cl.
*B60R 13/04* (2006.01)
(52) U.S. Cl. ..................................... 296/191
(58) Field of Classification Search ................. 296/191, 296/180.2, 198; 49/465; 280/154
See application file for complete search history.

(56) References Cited

U.S. PATENT DOCUMENTS

| | | | | |
|---|---|---|---|---|
| 4,420,058 A * | 12/1983 | Sato et al. .................. 180/68.6 |
| 4,817,976 A * | 4/1989 | Kingsley ...................... 280/154 |
| 4,925,235 A * | 5/1990 | Fingerle .................... 296/180.2 |
| 4,991,906 A | 2/1991 | Fingerle |
| 5,374,094 A * | 12/1994 | Smith et al. .............. 296/26.05 |
| 5,785,373 A * | 7/1998 | Futrell et al. ............. 296/26.01 |
| 5,787,650 A * | 8/1998 | Miller et al. ................. 296/165 |
| 5,788,321 A * | 8/1998 | McHorse et al. .......... 296/180.1 |
| 5,915,774 A * | 6/1999 | Tiedge ..................... 296/26.13 |
| 5,950,975 A * | 9/1999 | Zieske ...................... 248/291.1 |
| 5,967,583 A * | 10/1999 | Wishart ....................... 296/156 |
| 6,010,182 A * | 1/2000 | Townsend ............. 296/203.01 |
| 6,098,346 A * | 8/2000 | Miller et al. ................. 296/171 |
| 6,224,126 B1 * | 5/2001 | Martin et al. ............ 296/26.01 |
| 6,257,655 B1 | 7/2001 | Selby et al. |
| 6,257,656 B1 | 7/2001 | Cook et al. |
| 6,302,475 B1 * | 10/2001 | Anderson .................... 296/175 |
| 6,340,191 B1 * | 1/2002 | Brady ....................... 296/37.6 |
| 6,581,708 B2 * | 6/2003 | Lawrence et al. .......... 180/69.1 |
| 6,619,714 B2 * | 9/2003 | Schneider et al. ........ 296/26.13 |
| 6,644,719 B2 * | 11/2003 | Young, Sr. .................. 296/165 |
| 6,648,373 B2 * | 11/2003 | Hawes ......................... 280/854 |
| 6,729,678 B1 * | 5/2004 | Atcravi ....................... 296/168 |
| 6,755,460 B1 * | 6/2004 | Marrs et al. ............ 296/187.12 |
| 6,893,048 B2 * | 5/2005 | Rush et al. ................... 280/854 |
| 6,896,318 B2 | 5/2005 | Marrs et al. |
| 6,905,164 B2 | 6/2005 | Marrs et al. |
| 7,150,483 B2 * | 12/2006 | Rasmussen .............. 296/26.14 |
| 7,163,258 B2 * | 1/2007 | Dyer et al. ................... 296/191 |
| 7,226,116 B2 * | 6/2007 | Jones ......................... 296/175 |

(Continued)

*Primary Examiner*—Kiran B. Patel
(74) *Attorney, Agent, or Firm*—Jeffrey P. Calfa; Mark C. Bach

(57) ABSTRACT

The invention is a chassis skirt for a motor vehicle's chassis. The chassis skirt has a panel assembly that releasably engages a frame assembly. The frame assembly mounts to a chassis, such as to a chassis mounted bracket like a battery box. The frame assembly has spaced apart bracket assemblies that can have a pin extending from a bracket to engage receivers in the panel assembly. Isolators in the frame assembly also engage the panel assembly. A spring is used to assist in moving the panel assembly away from the chassis to access the chassis mounted bracket.

9 Claims, 13 Drawing Sheets

U.S. PATENT DOCUMENTS

| | | | |
|---|---|---|---|
| 7,234,747 B2* | 6/2007 | Rasmussen | 296/26.01 |
| 7,469,949 B2* | 12/2008 | Harder | 296/26.13 |
| 2003/0085562 A1* | 5/2003 | Sparling | 280/789 |
| 2004/0212170 A1* | 10/2004 | Dyer, III | 280/154 |
| 2006/0131912 A1* | 6/2006 | MacLean | 296/26.13 |
| 2007/0120397 A1* | 5/2007 | Layfield et al. | 296/180.4 |

* cited by examiner

REMOVABLE CHASSIS SKIRT

BACKGROUND OF THE INVENTION

1. Field of the Invention

The present invention relates to a removable chassis skirt and a frame assembly for the chassis skirt for a motor vehicle such as a medium or heavy duty truck. The chassis skirt allows quick and easy access to components hung from the chassis frame rails, such as battery boxes.

2. Description of the Prior Art

Contemporary styling and good aerodynamic practice in truck design make use of chassis skirts which cover the lower portions of the truck's chassis. A disadvantage of this practice is that the skirt obstructs access to some components particularly batteries mounted on the frame rails or on supports depending from the frame rails of the vehicle chassis. Inspection or repair of these components can require removal of the panels of the chassis skirt. This is both time consuming and may require the use of tools. Prior art skirt panels fasten to a frame, which in turn attaches to the vehicle's chassis. As many as six to nine bolts, depending upon the configuration, may be used to attach the panel to the frame.

Therefore, it would be desirable to provide a chassis skirt that is easy to remove for access to components supported from a vehicle's chassis which require periodic inspection or maintenance. It would also be desirable to provide a chassis skirt that is easy to align with the other panels of the skirt.

SUMMARY OF THE INVENTION

According to the invention there is provided a chassis skirt for a motor vehicle. The chassis skirt has a panel assembly that releasably engages a frame assembly. The frame assembly can mount to a chassis, such as directly or by first mounting to a frame that mounts to the chassis, such as a battery box.

The frame assembly has two spaced apart bracket assemblies separated by a frame support. Each bracket assembly has a bracket and an arm connecting the bracket to the frame support. The frame assembly can also have isolators attached to the frame support and a spring attached to the frame support. The spring can attach to one of the bracket assemblies.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
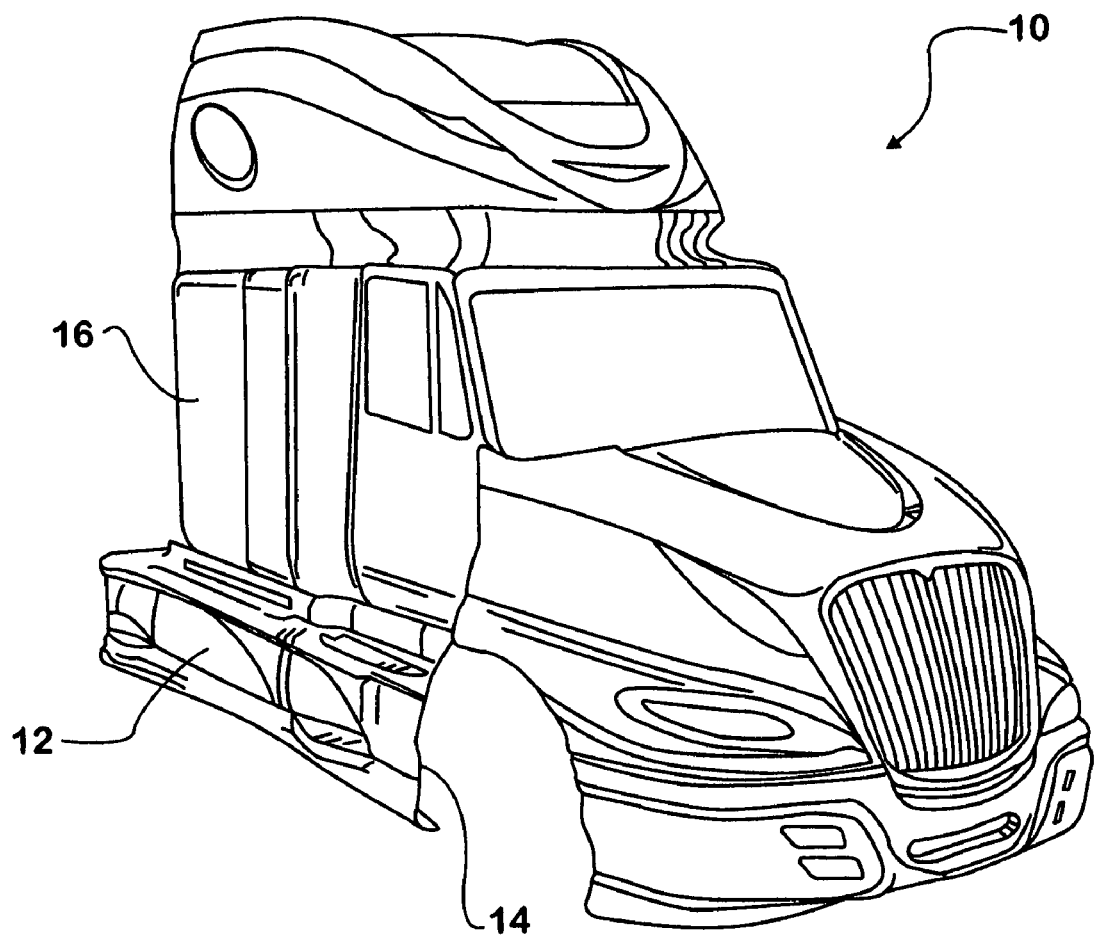
FIG. 1 is a partial perspective view of a motor vehicle with a chassis skirt of the invention.

Referring to the drawings, and particularly to FIG. 1, a truck body 10 has a lower body or chassis skirt 12 along the passenger side 16 of the truck body 10 behind a front wheel well 14. The chassis skirt 12 promotes a streamlined look and feel and hides components hung outside of the vehicle chassis. The chassis skirt 12 also provides some protection to the hidden components and some reduction in the vehicle's aerodynamic drag coefficient.

Figure 2:
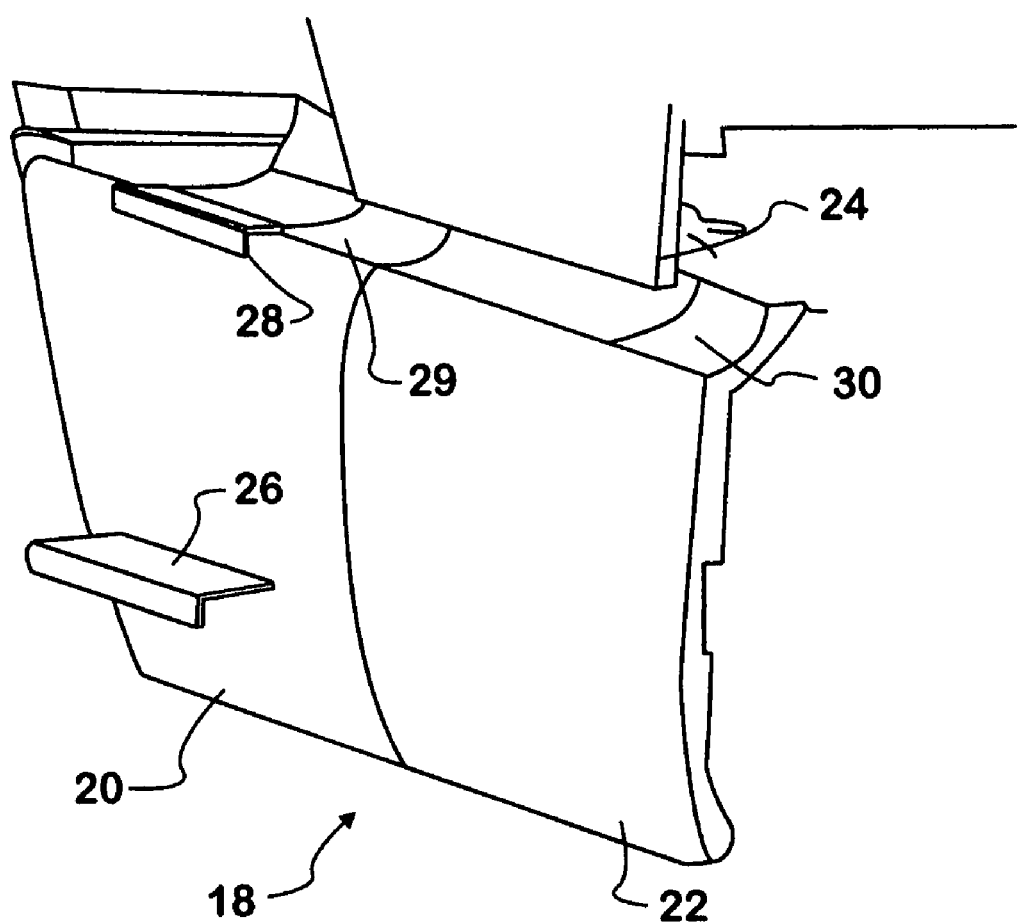
FIG. 2 is a partial perspective view of a motor vehicle with a chassis skirt of the invention.
Figure 3:
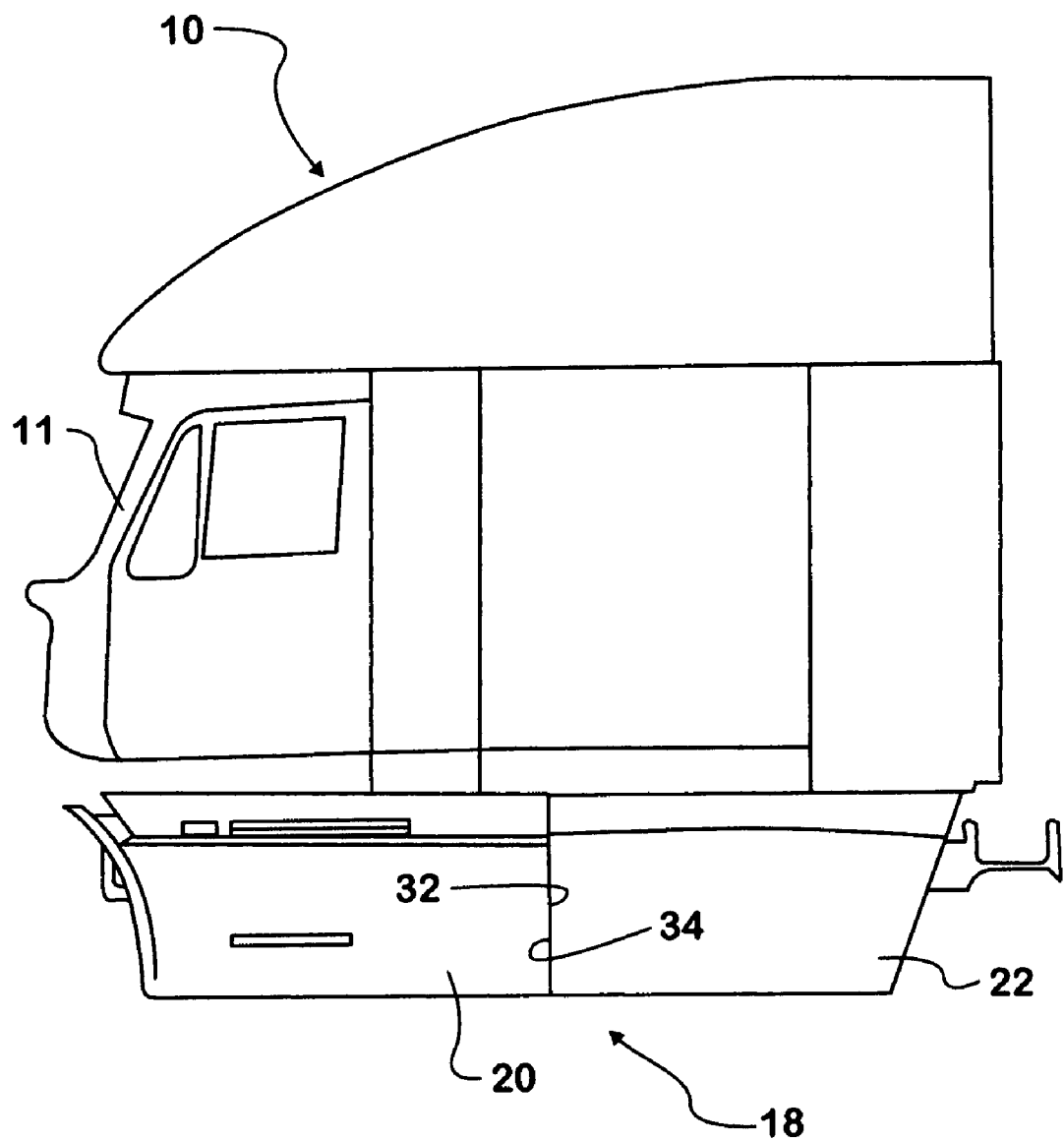
FIG. 3 is a side view of a motor vehicle with a chassis skirt of the invention.
Figure 4:
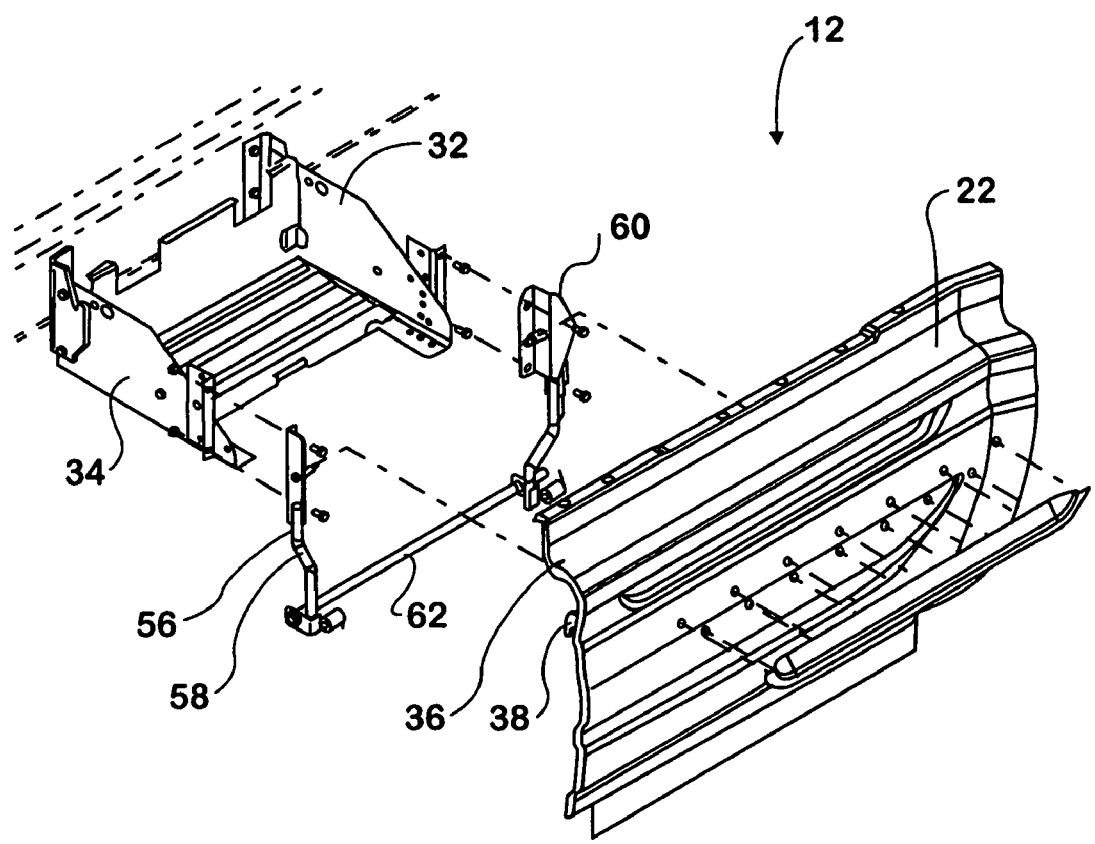
FIG. 4 is an exploded view of one of the embodiments of a chassis skirt of the invention.

FIG. 2 shows a two section chassis skirt 18 on the driver side of truck body 10. The chassis skirt 18 includes a forward panel 20 and a rearward, removable panel 22. Panels 20 and 22 align with one another and parallel the sides of the vehicle in the direction of elongation of the vehicle to form an apparently continuous chassis skirt 18. Panels 20 and 22 include upper concave indented sections 29 and 30 which sweep upwardly, with the upper portion of section 30 fitting behind body modesty panel 24, relative to the outside of the vehicle. Body modesty panel 24 forms the lower part of truck body 10. The outer faces of the major parts of panels 20 and 22 are generally in the same plane as, or bulge slightly outwardly from, the outer face of modesty panel 24. Steps 26 and 28 may be provided on or through the forward panel 20.

Chassis skirt 18 substantially hides the portion of a vehicle chassis directly under a cab section 11 of a truck body 10 from view from the side. A chassis mounted frame 32 mounts to the chassis 15 behind the panel 22. One example of a chassis mounted frame 32 is a battery box 34 that mounts to the outside of the chassis 15. The panel 22 is part of a panel assembly 36.

Figure 6:
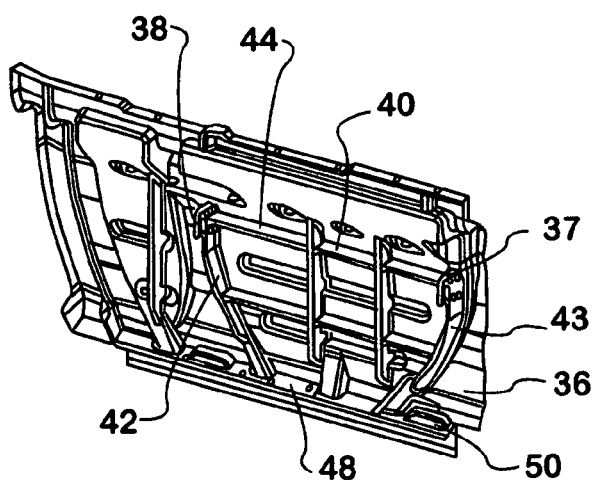
FIG. 6 is a perspective view of one embodiment of a panel assembly for a chassis skirt of the invention.
Figure 5:
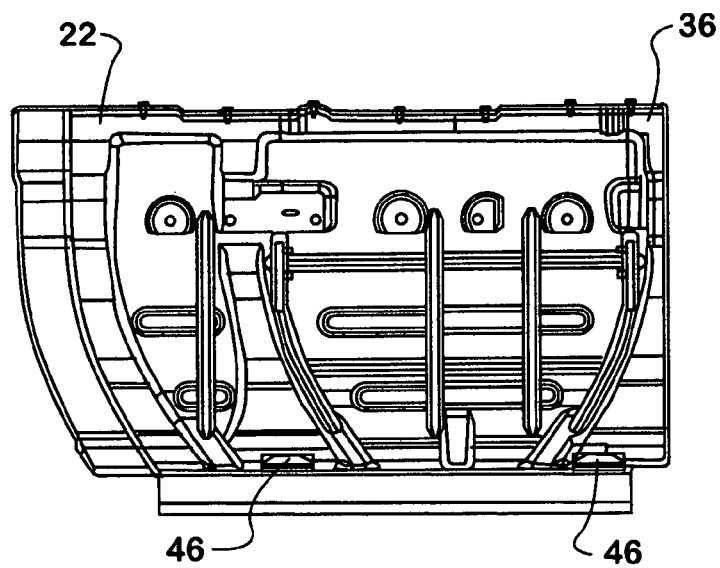
FIG. 5 is a front plan view of one embodiment of a panel assembly for a chassis skirt of the invention.
Figure 7:
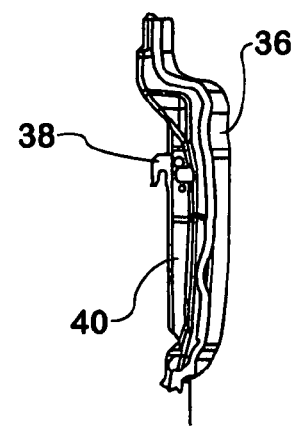
FIG. 7 is a side view of one embodiment of a panel assembly for a chassis skirt of the invention.
Figure 14:
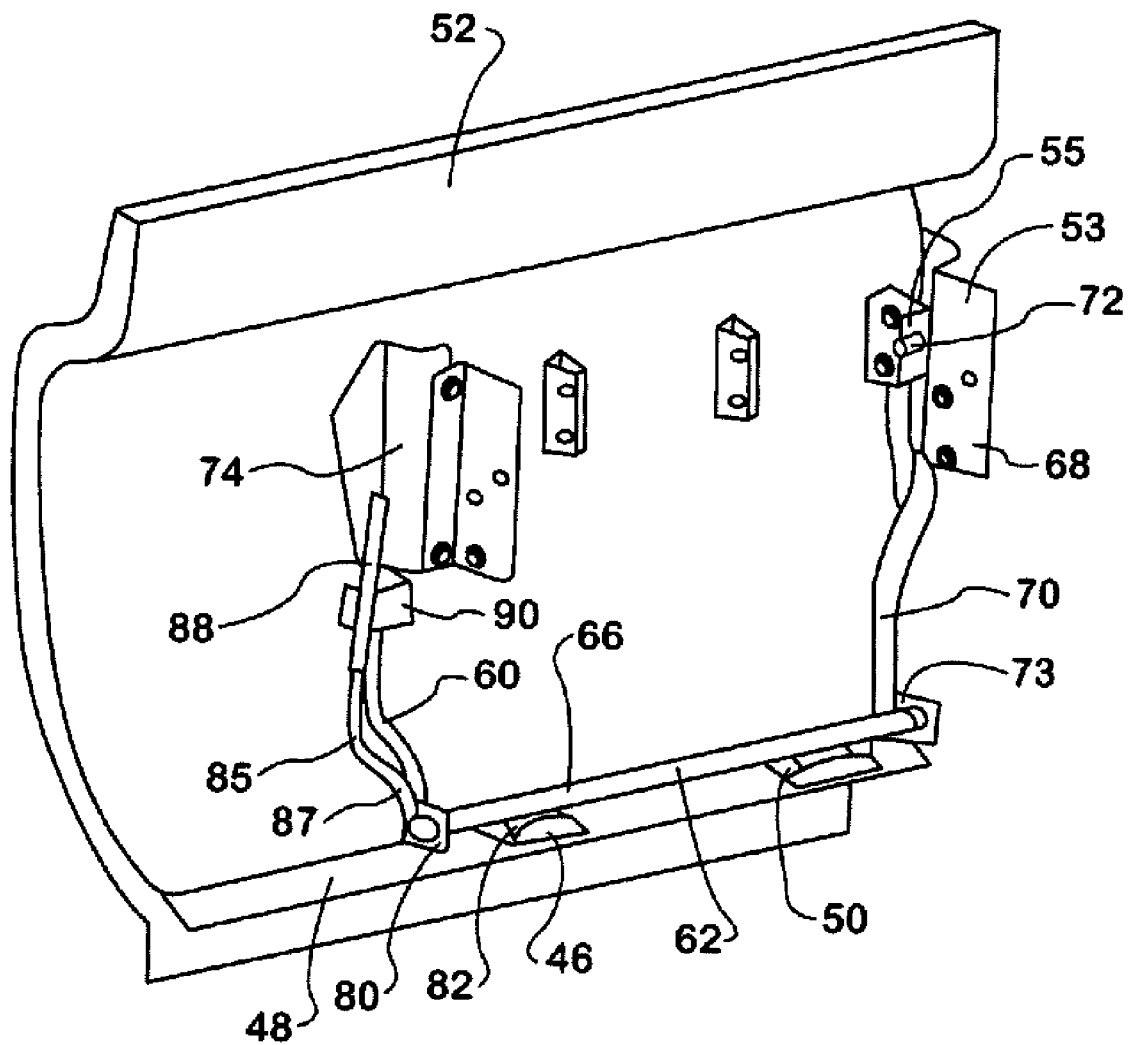
FIG. 14 is a perspective view of one embodiment of a frame assembly fastened to a panel assembly for a chassis skirt of the invention with the chassis mounted frame removed.
Figure 15:
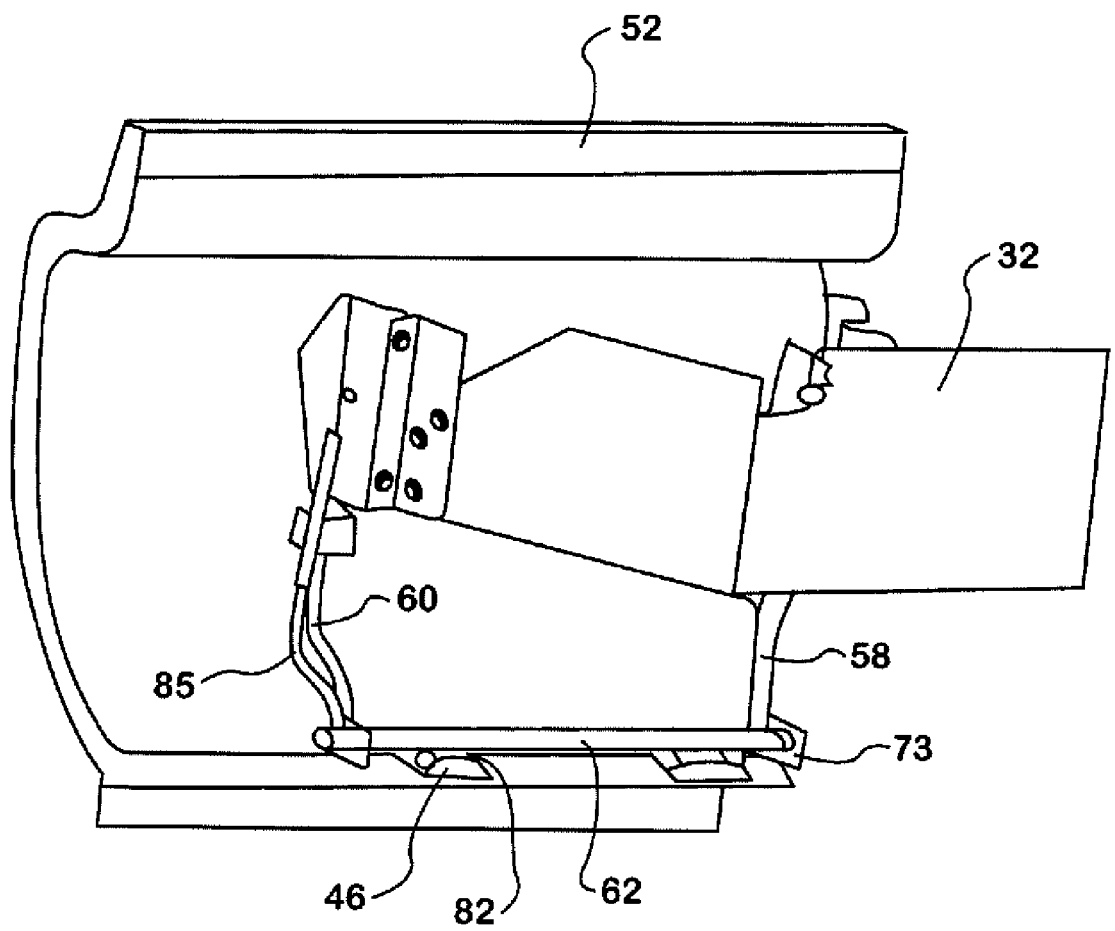
FIG. 15 is a perspective view of one embodiment of a frame assembly fastened to a panel assembly for a chassis skirt of the invention with the chassis mounted frame.

The panel assembly 36 releasably engages a frame assembly 56 when installed on the truck body 10, such as pins inserted into receivers or panel frames hanging onto receivers. As shown in FIGS. 5-7, the panel assembly 36 has receivers 37, for example slotted brackets or hooks 38, spaced apart from each other and located on the inside of the panel 22. The hooks 38 are integral with or fastened to a panel frame 40 disposed on the interior face of the panel 22. The panel frame 40 can have vertical and horizontal members 42, 43, 44, which can be curved if desired. The hooks 38 are located at the outer vertical members 42, 43. The hooks 38 can align with the width of the panel frame or project from the panel frame 40. The panel assemblies 52, 92 shown in FIGS. 14, 17 have hooks 55 fastened to a panel bracket 53 disposed on the interior face of the panel 22, 93. The receivers can also be disposed on the interior face of the panel.

At least one isolator bracket 46 is located at the bottom of the panel 22, preferably on the bottom lip 48 of the panel 22. If two isolator brackets 46 are used, both isolator brackets can be located lateral to the panel frame 40 or between the panel frame, or alternatively one located between the panel frame and one lateral to the panel frame. The isolator bracket 46 releasably engages a frame assembly and can have a channel 50.

As shown in FIGS. 9-12, the frame assembly 56 has first and second bracket assemblies 58, 60 spaced apart from each other with a frame support 62. The frame support 62 can include a support rod 66 and support brackets 73, 80 for engaging the bracket assemblies. Support rod 66 can releasably engage the support brackets 73, 80.

The first bracket assembly 58 has a first bracket 68 located at the end of a first arm 70 opposite the frame support 62. The first arm 70 connects the first bracket 68 to the frame support 62, such as with a first support bracket 73. A first bracket pin 72 extends from the first bracket 68 toward the second bracket assembly 60.

The second bracket assembly 60 has a second bracket 74 located at the end of a second arm 76 opposite the frame support 62. The second arm 76 connects the second bracket 74 to the frame support 62, such as with a second support bracket 80. A second pin 78 extends from the second bracket 74 toward the first bracket assembly 58. The brackets, such as second bracket 74, can be splayed brackets.

Each bracket assembly 58, 60 can mount with the bracket 68, 74 to the chassis either directly or to the chassis mounted frame 32. Each bracket 68, 74 engages the panel assembly 36, such as with the first and second pins 72, 78 engaging the hooks 38. Alternatively, each bracket 68, 74 could have a hook or slot engaging a pin on the panel assembly (not shown). The arms 70, 76 of the bracket assemblies 58, 60 are preferably curved, with the second arm 76 having a greater curvature than the first arm 70.

At least one isolator 82 projects from the frame support 62 toward the panel assembly 36. The isolator 82 can project from one of the support brackets 73, 80 or from the support rod 66. The isolator 82 can be any isolator known in the art, such as a roller, a pin with a bushing, a button, and the like, which can removably engage the panel's isolator bracket 46. Isolators are preferably a roller on a curved isolator pin curving toward the rear of the vehicle and held in place with a cotter pin.

A spring 84, 85 can be used in the frame assembly 56. The spring 84, 85 is preferably a spring rod 86, 87 connecting to the frame support 62 and engaging the second bracket assembly 60. The spring rod 86 can have a sleeve 88 at least partially covering the spring rod 86 distal to the frame support 62. The spring rod 86 can be curved. A spring clip 90 extends laterally from the second bracket assembly 60 to connect the spring rod 86 with the second bracket assembly 60.

Figure 8:
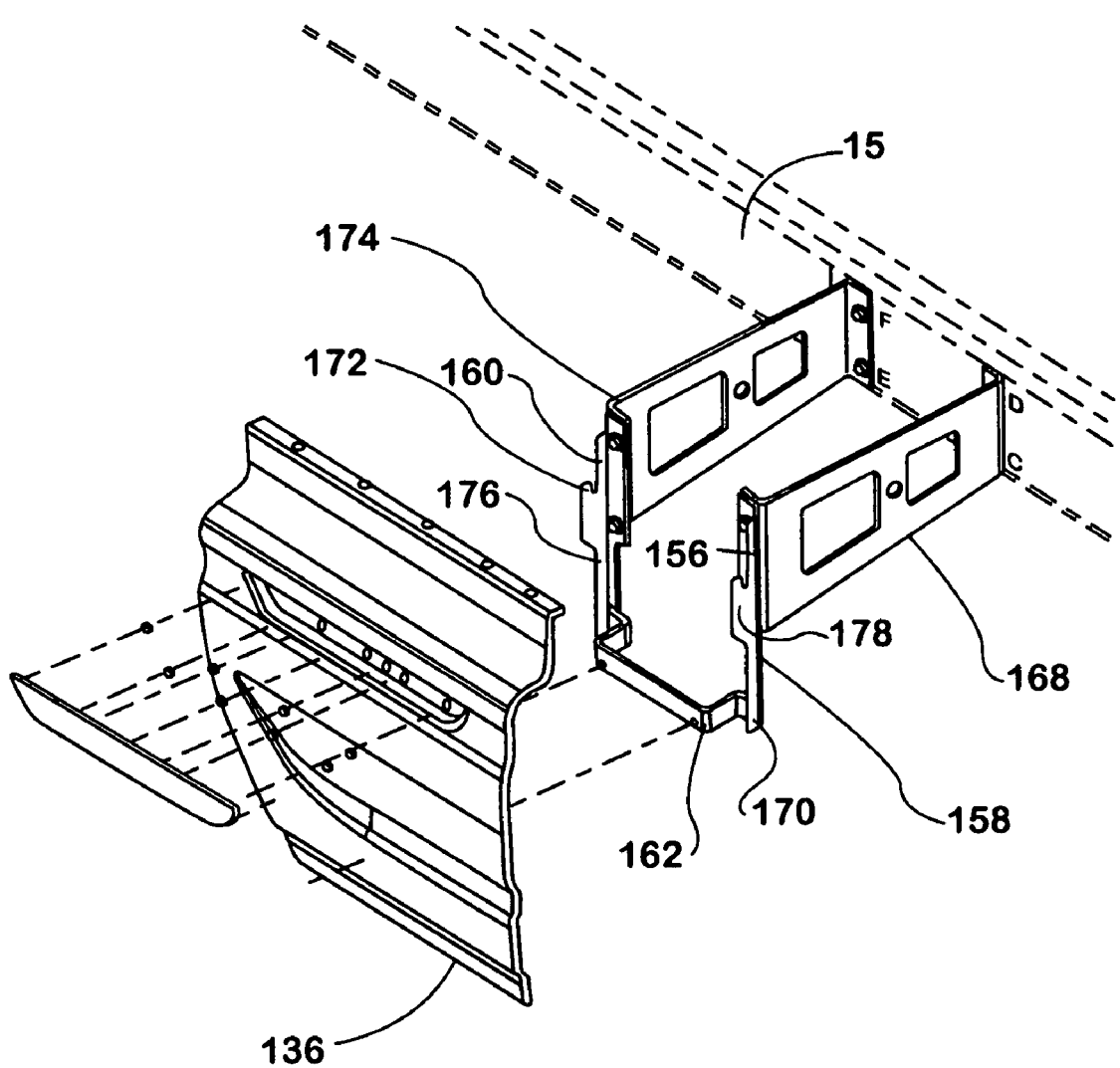
FIG. 8 is an exploded view of one embodiment of a chassis skirt and frame assembly of the invention.
Figure 9:
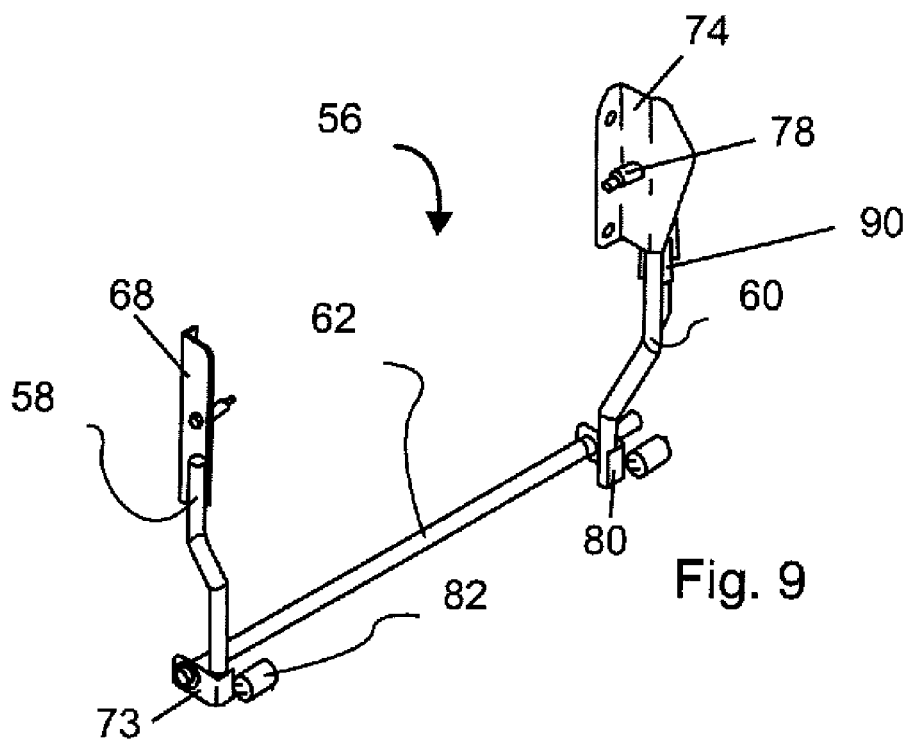
FIG. 9 is a perspective view of one embodiment of a frame assembly for a chassis skirt of the invention.
Figure 10:
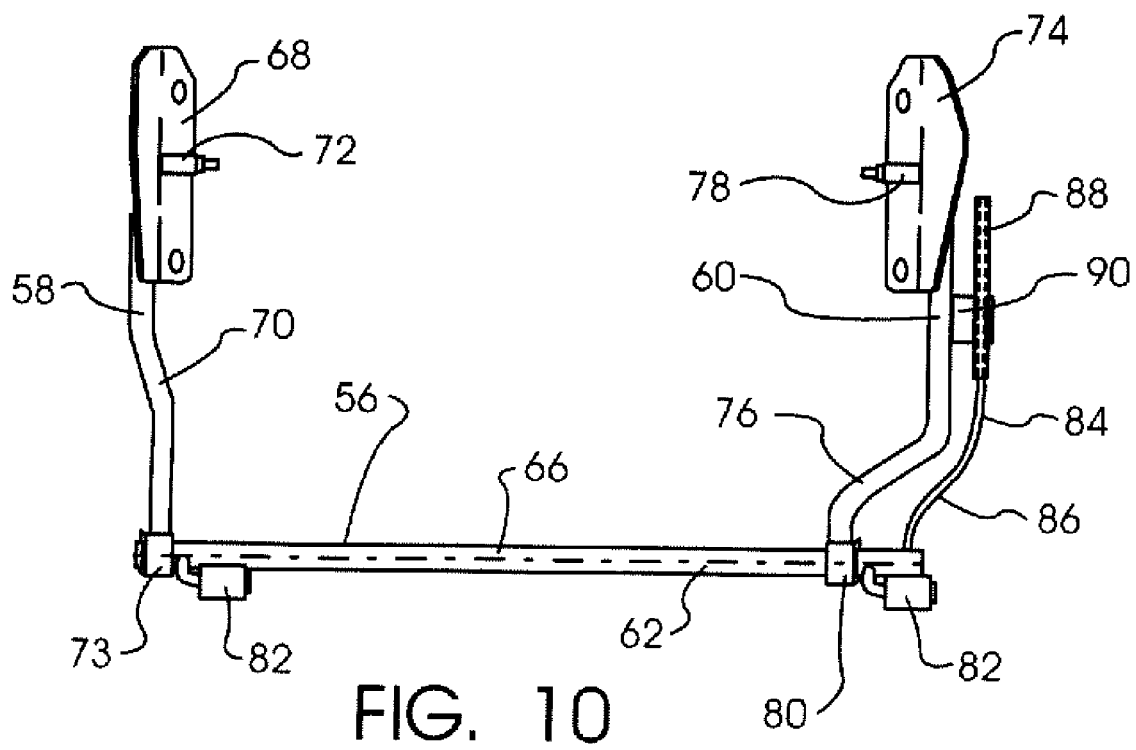
FIG. 10 is rear plan view of one embodiment of a frame assembly for a chassis skirt of the invention.
Figure 11:
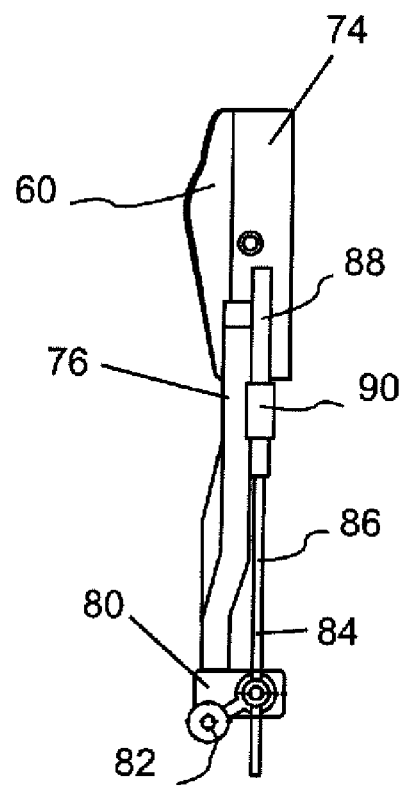
FIG. 11 is a side view of one embodiment of a frame assembly for a chassis skirt of the invention.
Figure 12:
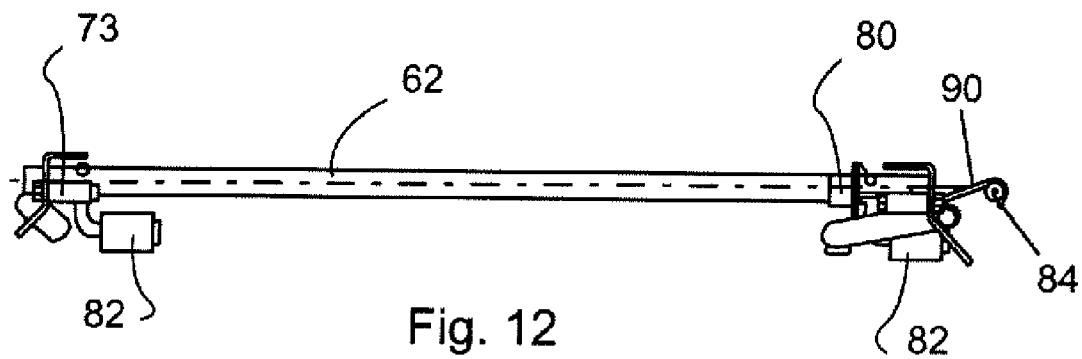
FIG. 12 is a bottom plan view of one embodiment of a frame assembly for a chassis skirt of the invention.
Figure 13:
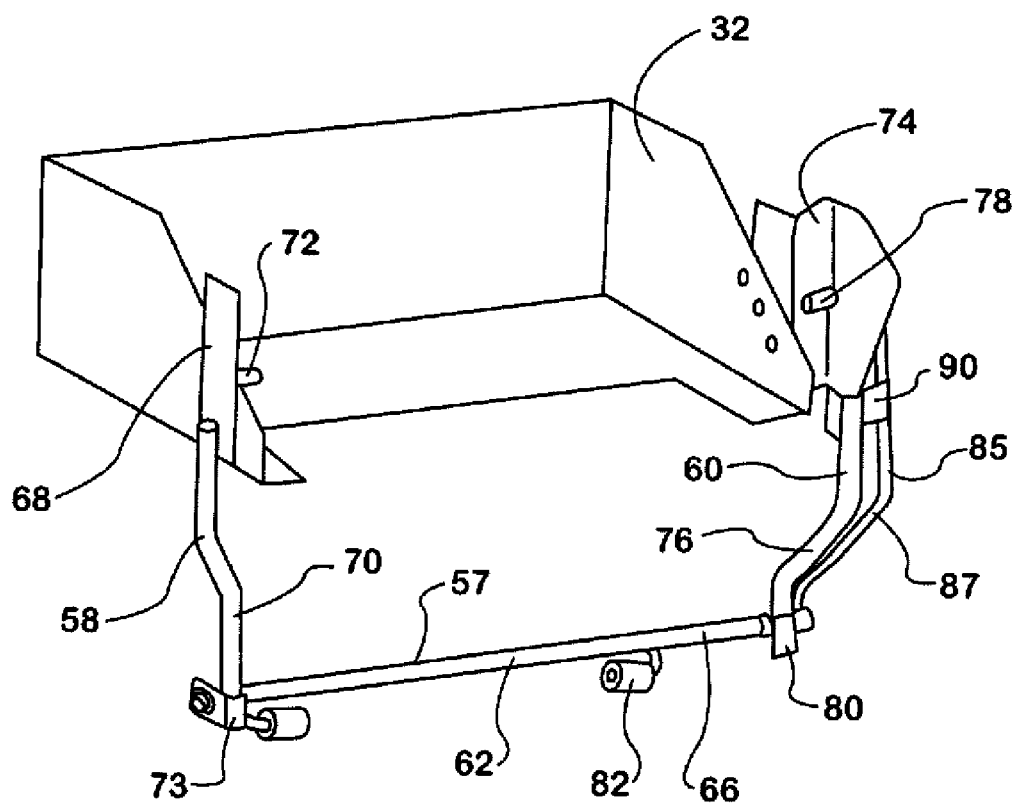
FIG. 13 is a perspective view of one embodiment of a frame assembly for a chassis skirt of the invention fastened to a chassis mounted frame.

Turning to FIG. 8, frame assembly 156 has first and second bracket assemblies 158, 160 spaced apart from each other with a frame support 162. The frame support 162 can be U-shaped engaging the bracket assemblies 158, 160. Each bracket assembly 158, 160 has a receiver 172 projecting from the arms 170, 176. Receiver 172 can be a slotted bracket or a hook 178. Each bracket assembly 158, 160 can mount with the bracket 168, 174 to the chassis 15 either directly or to the chassis mounted frame 32. The panel assembly 136 releasably engages the frame assembly 156 with a panel frame interlocking with the receivers 172, such as by hanging onto the hooks 176.

Figure 16:
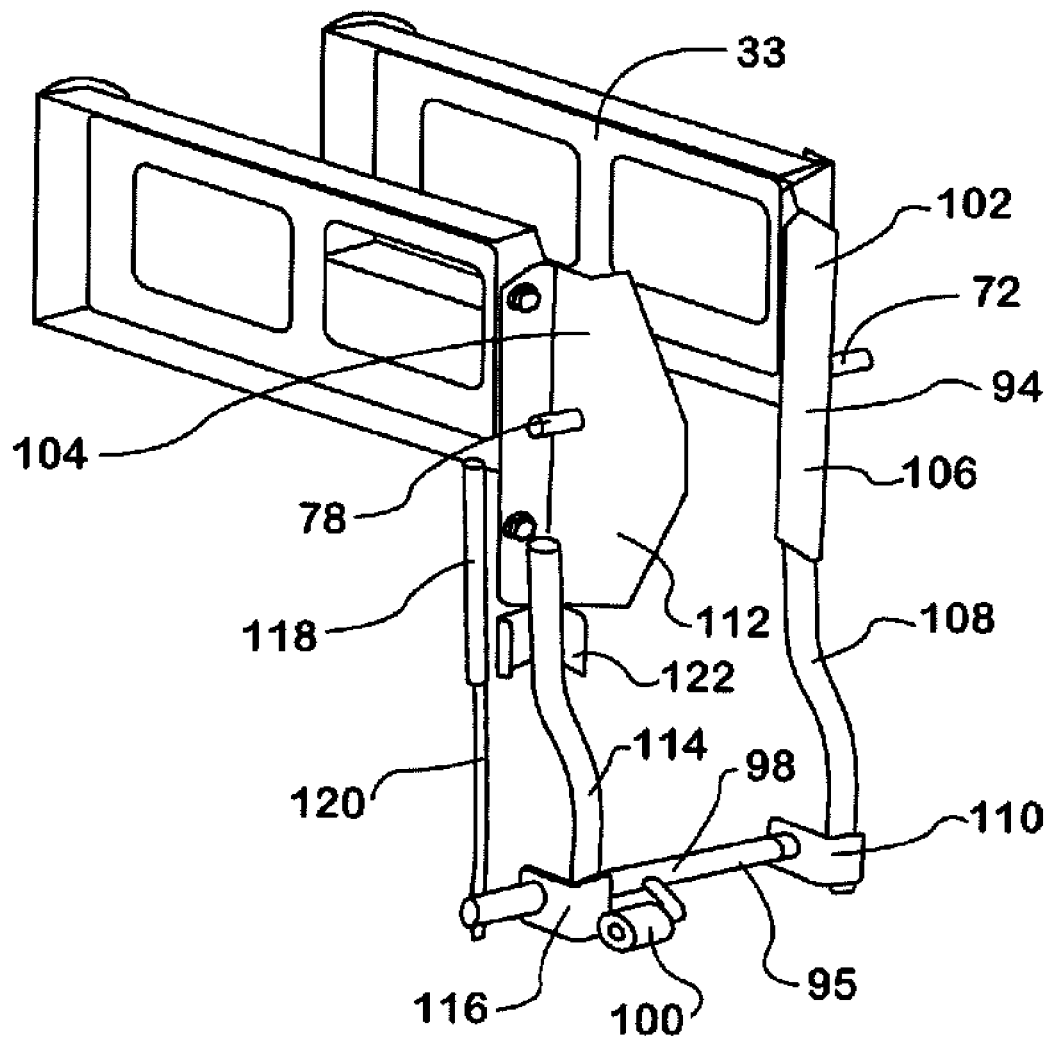
FIG. 16 is a perspective view of one embodiment of a frame assembly for a chassis skirt of the invention fastened to a chassis mounted frame.
Figure 17:
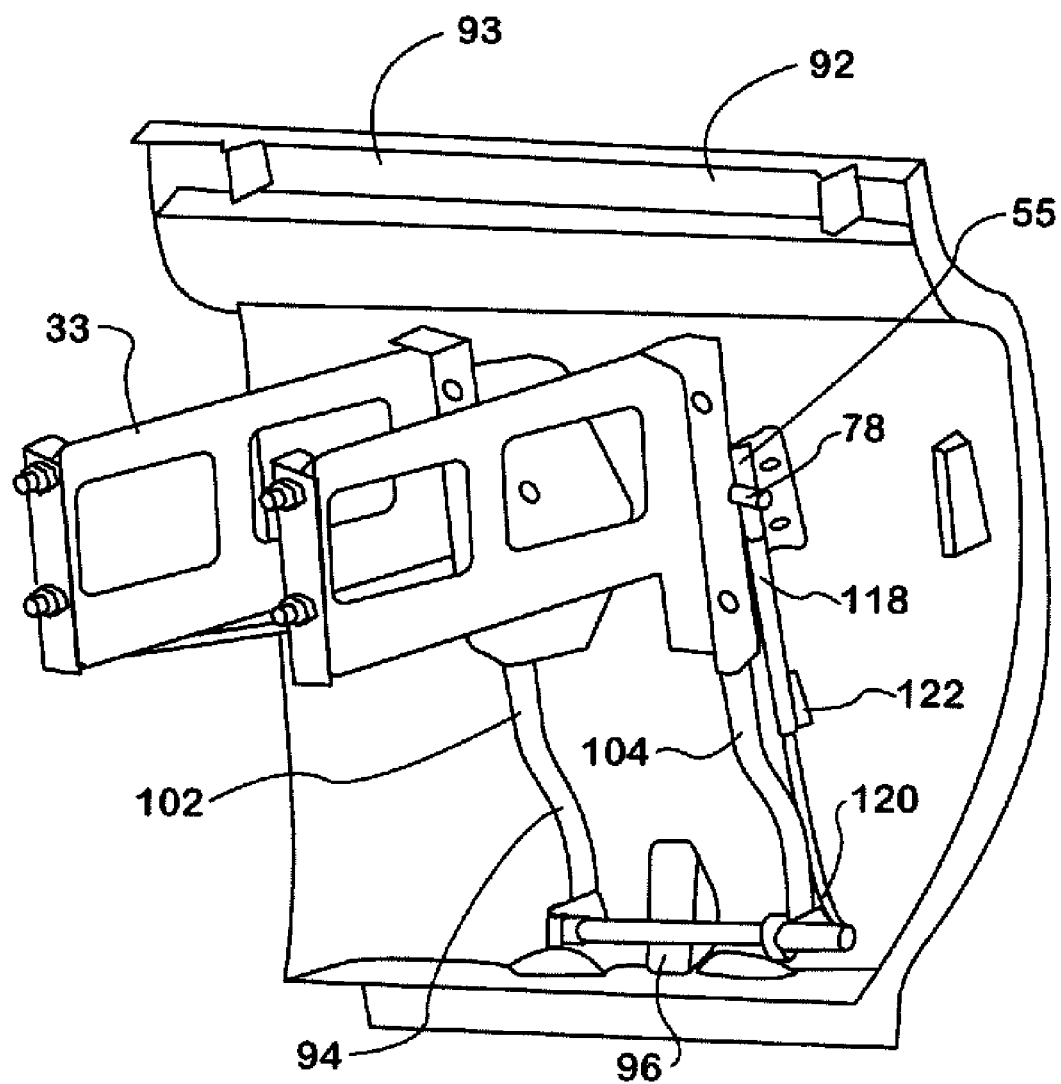
FIG. 17 is a perspective view of one embodiment of a frame assembly fastened to a panel assembly for a chassis skirt of the invention with the chassis mounted frame.

The chassis skirt of the invention shown in FIGS. 16-17 uses a shorter panel assembly 92 than panel assemblies 36, 52 and a narrower frame assembly 94 is used to fit the shorter panel assembly 92. The panel assembly 92 has a panel 93 with a frame receiver 96 to receive the rod 98 of frame assembly 94.

In this configuration, frame assembly 94 has opposite first and second bracket assemblies 102, 104 with bracket pins 72, 78 facing away from each other and one isolator 100. Frame assembly 94 mounts to chassis mounted frame 33 with first and second bracket assemblies 102, 104. The first bracket 106 of first bracket assembly 102 is located at the end of a first arm 108 opposite the frame support 95. The first arm 108 connects the first bracket 106 to the frame support 95, such as with a first support bracket 110. A first bracket pin 72 extends from the first bracket 106 away from the second bracket assembly 104.

The second bracket assembly 104 has a second bracket 112 located at the end of a second arm 114 opposite the frame support 95. The second arm 114 connects the second bracket 112 to the frame support 95, such as with a second support bracket 116. A second pin 78 extends from the second bracket 112 away the first bracket assembly 102.

A spring 118 with a spring rod 120 can be used in the frame assembly 94. In this embodiment, the spring rod 118 has a smaller curvature. Spring clip 122 extends laterally from the second bracket assembly 104 to clip onto the spring rod 118.

The chassis skirt of the invention is easy to use. During use, the panel assembly hangs on the frame assembly, such as with the receivers. The receivers, for example, are placed onto the pins and the frame assembly supports the panel assembly. By pushing on the bottom of the panel assembly, the support rod of the frame assembly rotates and the isolators move to latch into the isolator brackets. The spring moves toward the panel assembly, engages the spring clip and compresses once the isolators latch into the isolator brackets. The bottom of the panel assembly is now in place and simply fastens to the chassis with fasteners by hand.

When removing the panel assembly from the vehicle to access the desired component in the chassis mounted frame, the fasteners are removed from the bottom of the panel assembly. The spring releases from the spring clip and pushes the bottom of the panel assembly outward from the chassis. The isolators disengage from the isolator brackets. The panel assembly is now readily unhooked from the pins and removed. The chassis component is now easily accessed.

The chassis skirt of the invention has a number of advantages. The panel assemblies are easy to install and remove. The panel assembly mounts to the chassis using receivers at the top and fasteners at the bottom that can be removed by hand. This allows the panel assembly to be removed easily without special tools. The spring can be used to help move the isolators from the isolator brackets to make the panel assembly easier to grip and remove from the truck body. The chassis skirt of the invention also allows for vertical adjustment for proper alignment between the front and rear panels.

While the invention is shown in only one of its forms, it is not thus limited but is susceptible to various changes and modifications without departing from the spirit and scope of the invention.

What is claimed is:

1. A truck body having left and right sides, the truck body comprising:
   - a vehicle chassis on which the truck body is mounted;
   - a frame support having a support rod, and support brackets attaching to the support rod;
   - first and second bracket assemblies spaced apart at opposite ends of the support rod of the frame support, each bracket assembly having a bracket, and an arm connecting the bracket to one of the support brackets of the frame support;
   - a panel assembly releasably engaging the bracket assemblies and having a panel; and
   - wherein the panel assembly covers a portion of the vehicle chassis.

2. A truck body having left and right sides of claim 1, further comprising:
   - an isolator projecting from the frame support and engaging the panel assembly; and
   - a spring connecting to the support rod of the frame support lateral to the second bracket assembly.

3. A truck body having left and right sides of claim 2, wherein the panel assembly releasably engages the brackets with pins engaging receivers.

4. A truck body having left and right sides of claim 3, further comprising:
   - a chassis mounted frame mounting to the chassis and the brackets.

5. A truck body having left and right sides of claim 4, wherein the spring further comprises:
   - a spring rod connecting to the support rod of the frame support.

6. A truck body having left and right sides of claim 5, wherein each bracket has a pin releasably engaging a hook located on the panel assembly.

7. A truck body having left and right sides of claim 6, further comprising:
   - a spring clip extending laterally from the second bracket assembly and connecting the spring to the second bracket assembly.

8. A truck body having left and right sides of claim 1, wherein the panel assembly releasably engages the bracket assemblies by hanging on receivers projecting from the arms of the bracket assemblies.

9. A truck body having left and right sides of claim 8, wherein the frame support is U-shaped.

* * * * *